United States Patent [19]

Spears et al.

[11] Patent Number: 5,437,481
[45] Date of Patent: Aug. 1, 1995

[54] DURABLE PLASTIC/METAL TRANSITION FITTING

[75] Inventors: Wayne Spears, Sylmar; Harry Bekeredjian, Van Nuys, both of Calif.

[73] Assignee: Spears Manufacturing Company, Sylmar, Calif.

[21] Appl. No.: 136,301

[22] Filed: Oct. 13, 1993

[51] Int. Cl.⁶ .......................................... F16L 55/00
[52] U.S. Cl. .................................. 285/174; 285/330
[58] Field of Search ............... 285/173, 174, 330, 423, 285/918, 347

[56] References Cited

U.S. PATENT DOCUMENTS

| | | | |
|---|---|---|---|
| 3,712,631 | 1/1973 | Forchini et al. | 285/918 X |
| 4,428,602 | 1/1984 | Lambot et al. | 285/174 X |
| 4,919,461 | 4/1990 | Reynolds | 285/174 |
| 5,109,929 | 5/1992 | Spears | 285/174 X |
| 5,215,341 | 6/1993 | Namakura et al. | 285/423 |

OTHER PUBLICATIONS

Spears Manufacturing Co. Brochure, "PVC & CPVC Transition Adapters", BR-2-0393, Feb. 1993.
Spears Manufacturing C. Brochure, "CPVC Schedule 80 and 150 Series Large Diameter Fittings", 800C-0293, Printed Jan. 1993.
Spears Manufacturing C. Brochure, "CPVC Schedule 80 and 150 Series Large Diameter Fittings", 800C-02-93A, Printed Jan. 1993.
Spears Manufacturing Co. Brochure, "BlazeMaster Fire Sprinkler Piping Products" List Price Schedule, FS-1-0592, Printed Apr. 1992.

*Primary Examiner*—Dave W. Arola
*Attorney, Agent, or Firm*—Jeffrey G. Sheldon; Sheldon & Mak

[57] ABSTRACT

A fitting suitable for coupling a plastic pipe to an externally threaded metal element, such as a sprinkler head, comprises a coupling, an external, metallic reinforcing collar on the coupling, an internally threaded insert in the coupling, and an O-ring. The collar is shaped to prevent rotation, and is held in place by a lip on the insert. The O-ring is held in a chamfered recess on the external surface of the insert.

31 Claims, 1 Drawing Sheet

DURABLE PLASTIC/METAL TRANSITION FITTING

BACKGROUND

The present invention is directed to a fitting suitable for connecting a plastic fluid transmission element to an externally threaded, metallic transmission element.

Fittings for coupling plastic to metal elements are needed in many applications. For example, in commercial sprinkler systems, plastic pipes are used for transmitting water to sprinkler heads, which are typically made of metal. Other applications where plastic to metal transitions occur include hot and cold water pipes into and from hot water heaters, municipal water main connections to residential housing, and swimming pool and spa heaters.

Plastic female threaded fittings are typically used for this purpose. The difficulty with these fittings is that they sometimes fail in use. The failure most often occurs when a metal nipple is threaded into the plastic female threaded fitting and excessive torque is applied. Because of the visco-elastic nature of certain plastic materials, they yield more easily on thread makeup than metal. The circumferential stresses generated can exceed the failure limit of the plastic material. Because of the inherent potential for failure when using plastic female threaded fittings to join metal male threaded fittings, some municipal codes, such as the UPC prohibit the use of female threaded fittings.

Other fittings using O-rings have experienced leakage where inspectors and installers have mistakenly unthreaded the insert out of the coupling.

Accordingly, there is a need for a metal/plastic fitting that is strong, has better resistance to leakage and stress cracking than conventional fittings, and prevents rotation of the insert when torque is applied.

SUMMARY

The present invention provides fittings that meet these needs, and which have many unique features, which can be used alone or in combination. A fitting according to the present invention comprises (a) a tubular coupling, (b) a reinforcing collar, (c) a metallic insert, and (d) an O-ring.

In particular, the coupling has a forward metal connection portion and a rearward plastic connection portion, with the metal connection portion having an end edge. The external diameter of the plastic connection portion is larger than the external diameter of a metal connection portion with a transition ledge therebetween. The reinforcing collar is mounted on the external surface of the metal connection portion of the coupling. The forward end of the collar has an inwardly extending lip overlapping the end edge of the coupling. The rearward end of the collar is irregularly shaped with the transition of the coupling having a corresponding shape to interfere with the collar rotating on the coupling.

The insert has an outwardly extending lip that overlaps the lip of the collar to retain the collar on the coupling. In addition, the insert has a circumferential recess or seat its internal surface to receive the O-ring. A forward wall of the recess is chamfered to improve the leak resistance properties of the O-ring.

Preferably the external surface of the metallic insert is knurled for engagement with the internal surface of the coupling. To prevent stress cracking of the coupling, preferably the knurls are buffed to avoid sharp edges that can cause such stress cracking.

Preferably the edges of the recess for the O-ring are chamfered to avoid stress cracking.

Disadvantages of prior art fittings are avoided in that the insert cannot be unthreaded, the reinforcing collar remains securely on the fitting, stress cracking is reduced, and leakage past the O-ring is avoided.

DRAWINGS

These and other features, aspects and advantages of the present invention will become better understood from the following description, appended claims, and accompanying drawings where:

DESCRIPTION

Figure 4:
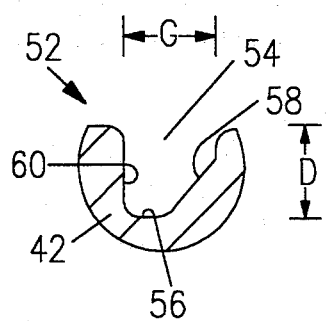
FIG. 4 shows in detail the O-ring gland of the fitting in region 4 of FIG. 3.

With reference to the figures, a fitting 10 according to the present invention comprises a plastic, hollow tubular coupling 12, an external, metallic reinforcing collar 14, a tubular, internally threaded, metallic insert 16, and an O-ring 18.

The coupling 12 has a forward metal connection portion 20, an opposed rearward plastic connection portion 22, an internal surface 24, and an external surface 26. The plastic connection portion 22 is suitable for connection to a plastic fluid transmission element (not shown). The external diameter of the plastic connection portion 22 is larger than the external diameter of the metal connection portion 20, with a sloping, transition ledge 28 therebetween.

The coupling is conventionally injection-molded from a plastic material, such as polyvinyl chloride (PVC), or chlorinated polyvinyl chloride (CPVC).

The reinforcing collar 14 is mounted on the external surface 26 of the metal connection portion 20 of the coupling 12. The collar 14 has a forward end 30 and a rearward end 32. The rearward end 32 is irregularly shaped, i.e., the end edge 34 of the collar is wave-shaped. This wave-shaped end edge 34 cooperates with the sloping ledge 28 of the coupling which is correspondingly shaped, thereby preventing rotational movent of the collar on the coupling. This cooperation between the ledge 28 and the collar 14 results from the coupling being injection-molded with the collar 14 in place. The reinforcing collar is typically formed of stainless steel.

The forward end 30 of the collar has an inwardly extending lip 36 that overlaps and protects the corresponding end edge 38 of the coupling 12.

The insert 16 has an external surface 42, an internal surface 44 that includes a threaded portion 45, a rearward base portion 46, a forward portion 48, an outwardly extending lip 50 on the end of the forward portion 48, and a circumferential recess or groove 52 in the external surface 42 of the base portion 46 for receiving the O-ring 18. The insert is typically formed of brass. The lip 50 of the insert 16 overlaps the corresponding lip 36 of the collar 14 to prevent the collar from slipping off the coupling 12.

The recess (also known as a gland or seat) 52 has an opening 54, a base 56, a forward wall 58, and a rearward wall 60. The forward wall 58 slopes at an angle of about 45° relative to the longitudinal axis 61 of the coupling 12 so the recess is wider at its opening 54 than at its base 56. The purpose of this shape for the seat 52 is to improve O-ring compression characteristics, thereby avoiding leakage. The edges 62 of the recess 52 and the edge 63 at the base of the insert 16 are chamfered, typically by about 1/64 of an inch. These radiused edges reduce potential for stress-crack inducement at these locations of the fitting.

Figure 3:
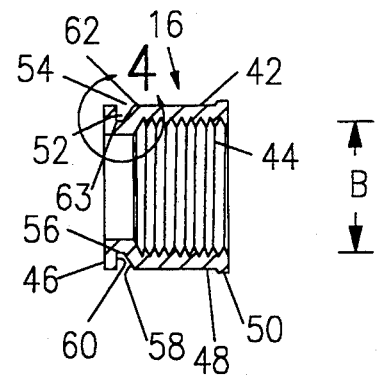
FIG. 3 is a transverse sectional view of the insert of the fitting of FIGS. 1 and 2.
Figure 1:
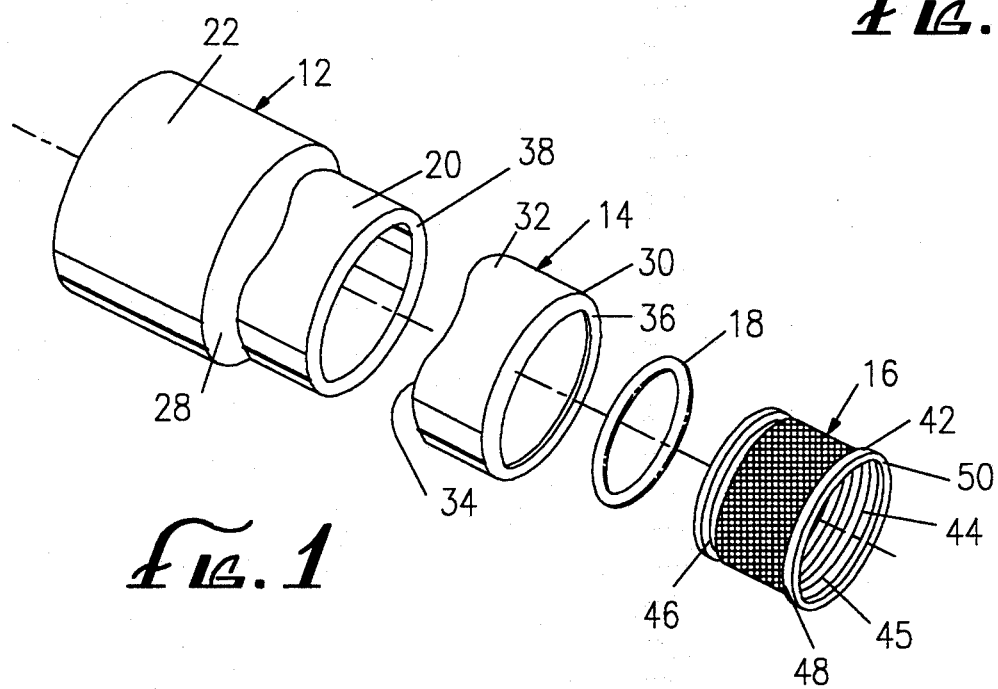
FIG. 1 is an exploded perspective view of a fitting according to present invention.

With reference to FIG. 4, the O-ring seat width (dimension "G" in FIG. 4) is slightly larger than the cross-section diameter of the O-ring used; the outer diameter at the bottom of the seat (dimension "B" in FIG. 3) is sized to about ⅛ larger than the inside diameter of the O-ring used; and the depth of the O-ring seat (dimension "D" in FIG. 4) is larger than the cross-section of the O-ring used. This helps stabilize the O-ring and improves its compression characteristics. The particular depth used for the O-ring seat also aids in anchoring the brass insert 16.

At least a portion of the external surface of the insert 16 is knurled for retaining the insert 16 within the coupling 12. These knurls can provide stress points that can lead to stress-cracking of the coupling. To minimize this potential problem, the knurls are formed by machining the external surface of the insert, generally in a diamond-shaped configuration. Then, any rough edges are buffed away.

Figure 2:
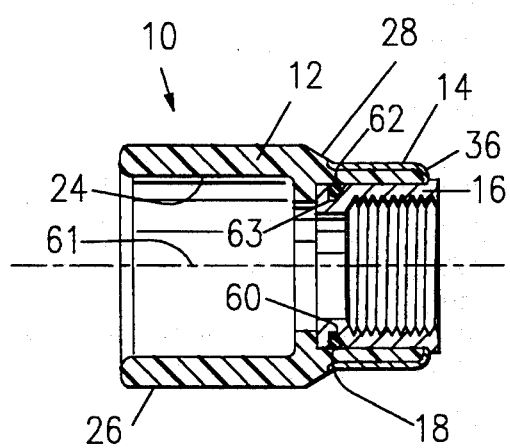
FIG. 2 is a transverse sectional view of a fitting according to present invention fabricated from the components shown in FIG. 1.

As shown in FIG. 2, the collar 14 is sufficiently long to overlie the entire metal connection portion 20 of the coupling, as well as the threaded portion 45 of the insert 16 and the O-ring 18. This provides reinforcement of the plastic coupling over the entire length of the threaded portion of the insert and the O-ring. This compares favorably to prior art fittings where there is only partial reinforcement at the insert entry end only.

In an exemplary version of the invention, the inside diameter of the O-ring 18 is 0.549 "±0.005", is made out of nitrile rubber, its thickness is 0.103 "±0.003", the depth of the recess or seat 52 is 0.110 "±0.002", its width at its base 56 is 0.050 "±0.002", and its width at its opening 54 is 0.105 "±0.003".

The fitting is formed using conventional insert injection molding techniques. In this procedure, the O-ring is mounted in the seat 52, the collar 14 and the insert 16 are placed in a die, and the flowable PVC or CPVC material is injected into the die.

Although the present invention has been described in considerable detail with reference to certain preferred versions thereof, other versions are possible. For example, the reinforcing collar can be made of a metal other than stainless steel, or can be made of a strong and durable plastic. Also, the fitting of the present invention, although suitable for coupling plastic elements to metal elements, can be used for coupling a plastic element to another plastic externally threaded element. Therefore, the spirit and scope of the appended claims should not be limited to the description of the preferred versions contained herein.

What is claimed is:

1. A fitting suitable for coupling a plastic fluid transmission element to an externally threaded metal element, the fitting comprising:

(a) a plastic, hollow, tubular coupling having (i) a forward metal connection portion and an opposed rearward plastic connection portion, (ii) an internal surface, and (iii) an external surface, (iv) the plastic connection portion being suitable for connection to a plastic fluid transmission element, (v) the metal connection portion having an end edge, and (vi) wherein the external diameter of the plastic connection portion is larger then the external diameter of the metal connection portion with a transition therebetween on the external surface of the coupling;
    (b) an external, metallic reinforcing collar mounted on the external surface of the metal connection portion of the coupling, the collar having (i) a forward end and (ii) a rearward end, and (iii) wherein the rearward end is irregularly shaped with the transition of the coupling having a corresponding shape to interfere with the collar from rotating on the coupling; and
    (c) a tubular, internally threaded, metallic insert retained in the metal connection portion of the coupling.

2. The fitting of claim 1 wherein the forward end of the collar has a lip overlapping the end edge of the coupling, and the forward end of the coupling has a lip overlapping the lip of the collar to retain the collar on the coupling.

3. The fitting of claim 2 wherein the insert has an external surface, and at least a portion of the external surface of the insert is knurled for engagement with the internal surface of the coupling, wherein the knurls are buffed to prevent sharp edges that can cause stress cracking of the coupling.

4. The fitting of claim 2 wherein the insert has (i) an external surface, (ii) a rearward base portion, (iii) a forward portion, and (iv) a circumferential seat in the external surface of the base portion for receiving an O-ring, the seat having an opening, a base, and a forward wall that slopes at an angle of about 45° relative to the longitudinal axis of the coupling so that the O-ring seat is wider at its opening than at its base; and wherein the fitting comprises an O-ring in the seat, the O-ring being compressed between the insert and the coupling.

5. The fitting of claim 4 wherein the insert has an external surface, and at least a portion of the external surface of the insert is knurled for engagement with the internal surface of the coupling, wherein the knurls are buffed to prevent sharp edges that can cause stress cracking of the coupling.

6. The fitting of claim 4 wherein the edges of the circumferential seat for the O-ring are chamfered to avoid stress cracking.

7. The fitting of claim 4 wherein the collar is sufficiently long to extend over the O-ring.

8. The fitting of claim 1 wherein the insert has (i) an external surface and (ii) a circumferential seat in the external surface of the base portion for receiving an O-ring, the seat having an opening, a base, and a forward wall that slopes at an angle of about 45° relative to the longitudinal axis of the coupling so that the O-ring seat is wider at its opening than at its base; and wherein the fitting comprises an O-ring in the seat, the O-ring being compressed between the insert and the coupling.

9. The fitting of claim 8 wherein at least a portion of the external surface of the insert is knurled for engagement with the internal surface of the coupling, wherein the knurls are buffed to prevent sharp edges that can cause stress cracking of the coupling.

10. The fitting of claim 1 wherein the insert has an internal surface and an external surface, and at least a portion of the external surface of the insert is knurled for engagement with the internal surface of the coupling, wherein the knurls are buffed to prevent sharp edges that can cause stress cracking of the coupling.

11. The fitting of claim 1 wherein the collar is sufficiently long to completely overlie the metal connection portion of the coupling.

12. The fitting of claim 1 wherein the collar is sufficiently long to extend over the entire threaded portion of the insert.

13. A fitting suitable for coupling a plastic fluid transmission element to an externally threaded metal element, the fitting comprising:
 (a) a plastic, hollow, tubular coupling having (i) a forward metal connection and an opposed rearward plastic connection portion, (ii) an internal surface, and (iii) an external surface, (iv) the plastic connection portion being suitable for connection to a plastic fluid transmission element, and (v) the metal connection portion having an end edge;
 (b) an external, reinforcing collar mounted on the external surface of the metal connection portion of the coupling, the collar having (i) a forward end and (ii) a rearward end, (iii) the forward end having a lip overlapping the end edge of the coupling; and
 (c) a tubular, internally threaded, metallic insert retained in the metal connection portion of the coupling, the insert having (i) an external surface, (ii) a rearward base portion, (iii) a forward portion, and (iv) an inwardly extending lip on the end of the forward portion overlapping the lip of the collar to retain the collar on the coupling.

14. The fitting of claim 13 wherein the insert has a circumferential seat in the external surface of the base portion for receiving an O-ring, the seat having an opening, a base, and a forward wall that slopes at an angle of about 45° relative to the longitudinal axis of the coupling so that the O-ring seat is wider at its opening than at its base; and
 wherein the fitting comprises an O-ring in the seat, the O-ring being compressed between the insert and the coupling.

15. The fitting of claim 14 wherein at least a portion of the external surface of the insert is knurled for engagement with the internal surface of the coupling, wherein the knurls are buffed to prevent sharp edges that can cause stress cracking of the coupling.

16. The fitting of claim 13 wherein at least a portion of the external surface of the insert is knurled for engagement with the internal surface of the coupling, wherein the knurls are buffed to prevent sharp edges that can cause stress cracking of the coupling.

17. The fitting of claim 13 wherein the collar is sufficiently long to completely overlie the metal connection portion of the coupling.

18. The fitting of claim 13 wherein the collar is sufficiently long to extend over the entire threaded portion of the insert.

19. A fitting suitable for coupling a plastic fluid transmission element to an externally threaded metal element, the fitting comprising:
 (a) a plastic, hollow, tubular coupling having (i) a forward metal connection and an opposed rearward plastic connection portion, (ii) an internal surface, (iii) an external surface, and (iv) a longitudinal axis, (v) wherein the plastic connection portion is suitable for connection to a plastic fluid transmission element, and (vi) wherein the metal connection portion has an end edge;
 (b) a tubular, internally threaded, metallic insert retained in the metal connection portion of the coupling, the insert having (i) an external surface, (ii) a rearward base portion, (iii) a forward portion, and (iv) a circumferential seat in the external surface of the base portion for receiving an O-ring, the O-ring seat having an opening, a base, and a forward wall that slopes at an angle of about 45° relative to the longitudinal axis of the coupling so that the seat is wider at its opening than at its base; and
 (c) an O-ring in the seat, the O-ring being compressed between the insert and the coupling.

20. The fitting of claim 19 wherein at least a portion of the external surface of the insert is knurled for engagement with the internal surface of the coupling, wherein the knurls are buffed to prevent sharp edges that can cause stress cracking of the coupling.

21. The fitting of claim 19 wherein the edges of the circumferential seat for the O-ring are chamfered to avoid stress cracking.

22. The fitting of claim 19 wherein the collar is sufficiently long to extend over the O-ring.

23. A fitting suitable for coupling a plastic fluid transmission element to an externally threaded metal element, the fitting comprising:
 (a) a plastic, hollow, tubular coupling having (i) a forward metal connection and an opposed rearward plastic connection portion, (ii) an internal surface, (iii) an external surface, and (iv) a longitudinal axis, (v) the plastic connection portion being suitable for connection to a plastic fluid transmission element, (vi) the metal connection portion having an end edge, and (vii) wherein the external diameter of the plastic connection portion is larger then the external diameter of the metal connection portion with a ledge therebetween on the external surface of the coupling;
 (b) an external, metallic reinforcing collar mounted on the external surface of the metal connection portion of the coupling, the collar having (i) a forward end and (ii) a rearward end, (iii) the forward end having an inwardly extending lip overlapping the end edge of the coupling, and (iv) wherein the rearward end is irregularly shaped with the ledge of the coupling having a corresponding shape to interfere with the collar from rotating on the coupling;
 (c) a tubular, internally threaded, metallic insert retained in the metal connection portion of the coupling, the insert having (i) an external surface, (ii) a rearward base portion, (iii) a forward portion, (iv) an outwardly extending lip on the end of the forward portion overlapping the lip of the collar to retain the collar on the coupling, and (v) a circumferential seat in the internal surface of the base portion for receiving an O-ring, (vi) the seat having an opening, a base, and a forward wall that slopes at an angle of about 45° relative to the longitudinal axis of the coupling so that the seat is wider at its opening than at its base, (vii) at least a portion of the external surface of the metallic insert being knurled for engagement with the internal surface of the coupling, wherein the knurls are buffed to prevent sharp edges that can cause stress cracking of the coupling; and (d) an O-ring in the seat, the O-ring being compressed between the insert and the coupling.

24. The fitting of claim 23 wherein the edges of the circumferential seat for the O-ring are chamfered to avoid stress cracking.

25. The fitting of claim 23 wherein the collar is sufficiently long to completely overlie the metal connection portion of the coupling.

26. The fitting of claim 23 wherein the collar is sufficiently long to extend over the entire threaded portion of the insert.

27. The fitting of claim 15 wherein the collar is sufficiently long to extend over the O-ring.

28. A fitting suitable for coupling a plastic fluid transmission element to an externally threaded metal element, the fitting comprising:

(a) a plastic, hollow, tubular coupling having (i) a forward metal connection portion and an opposed rearward plastic connection portion, (ii) an internal surface, and (iii) an external surface, (iv) the plastic connection portion being suitable for connection to a plastic fluid transmission element, (v) the metal connection portion having an end edge, and (vi) wherein the external diameter of the plastic connection portion is larger then the external diameter of the metal connection portion with a transition therebetween on the external surface of the coupling;

(b) an external, metallic reinforcing collar mounted on and in physical engagement with the external surface of the metal connection portion of the coupling, the collar having (i) a forward end and (ii) a rearward end, and (iii) wherein the rearward end is irregularly shaped with the transition of the coupling having a corresponding shape to interfere with the collar from rotating on the coupling; and (c) a tubular, internally threaded, metallic insert retained in the metal connection portion of the coupling, and in direct physical engagement with the coupling, wherein the fitting is formed by the coupling being injection molded in a die with the collar and insert preplaced therein.

29. The fitting of claim 28 wherein the forward end of the collar has a lip overlapping the end edge of the coupling, and the forward end of the coupling has a lip overlapping the lip of the collar to retain the collar on the coupling.

30. The fitting of claim 28 wherein the insert has (i) an external surface and (ii) a circumferential seat in the external surface of the base portion for receiving an O-ring, the seat having an opening, a base, and a forward wall that slopes at an angle of about 45° relative to the longitudinal axis of the coupling so that the O-ring seat is wider at its opening than at its base; and wherein the fitting comprises an O-ring in the seat, the O-ring being compressed between the insert and the coupling.

31. The fitting of claim 28 wherein the insert has an internal surface and an external surface, and at least a portion of the external surface of the insert is knurled for engagement with the internal surface of the coupling, wherein the knurls are buffed to prevent sharp edges that can cause stress cracking of the coupling.

* * * * *

UNITED STATES PATENT AND TRADEMARK OFFICE
CERTIFICATE OF CORRECTION

PATENT NO : 5,437,481
DATED : August 1, 1995
INVENTOR(S): Wayne Spears, Harry Bekeredjian It is certified that error appears in the above-identified patent and that said Letters Patent is hereby corrected as shown below:

Claim 13, line 20, "inwardly" should read

--outwardly--.

Signed and Sealed this

Seventeenth Day of June, 1997

Attest:

BRUCE LEHMAN

*Attesting Officer*     *Commissioner of Patents and Trademarks*